United States Patent
Dupuis et al.

(10) Patent No.: US 6,885,948 B2
(45) Date of Patent: Apr. 26, 2005

(54) DATA MANAGEMENT OF PIPELINE DATASETS

(75) Inventors: Bruce Robin Dupuis, Calgary (CA); Michael John Webb, Pickardville (CA)

(73) Assignee: Baseline Technologies, Inc., Calgary (CA)

( * ) Notice: Subject to any disclaimer, the term of this patent is extended or adjusted under 35 U.S.C. 154(b) by 174 days.

(21) Appl. No.: 10/325,445

(22) Filed: Dec. 19, 2002

(65) Prior Publication Data

US 2004/0122600 A1 Jun. 24, 2004

(51) Int. Cl.[7] .............................................. G01N 27/90
(52) U.S. Cl. ......................... 702/34; 702/38; 324/220; 324/240
(58) Field of Search .................. 702/34, 38; 228/102, 228/103, 104; 73/227; 33/121, 544; 345/441, 666; 324/220, 240

(56) References Cited

U.S. PATENT DOCUMENTS 5,737,227 A * 4/1998 Greenfield et al. ......... 705/400
6,272,457 B1 * 8/2001 Ford et al. ...................... 704/9
6,359,434 B1 * 3/2002 Winslow et al. ............ 324/220
2004/0118898 A1 * 6/2004 Dupuis et al. .............. 228/102

OTHER PUBLICATIONS

Dr. Robert L. Bass, Services for the Pipeline Industry, Published in Aug. 2000.*

* cited by examiner

Primary Examiner—John Barlow
Assistant Examiner—Hien Vo

(57) ABSTRACT

An apparatus for applying a method for managing the integration of multiple pipeline datasets into a combined dataset or superset otherwise known as an asset survey. As each dataset is integrated into the asset survey a data management module is responsible for setting the status field of each feature point dependant on its relative age, source, name and type. The field "status" has five distinct states; active, inactive, archived, super inactive and super active. Active is representative of the latest and most accurate condition of the pipeline. Inactive indicates that the record has either been superseded by better data or the record is from new data and has not yet been validated as accurate. Archived indicates the record is associated with a piece of pipe that was removed from service (i.e. cut out of the pipeline).

26 Claims, 5 Drawing Sheets

US 6,885,948 B2

DATA MANAGEMENT OF PIPELINE DATASETS

FIELD OF THE INVENTION

This invention relates generally to data management and particularly to tracking relevancy of multiple pipeline datasets to form an integrated dataset.

BACKGROUND OF THE INVENTION

The petroleum pipeline infrastructure in North America, estimated at three million miles of pipeline, was constructed over a period of eighty years. Many of the operating pipelines are now more than 50 years old. In recent years public concern has arisen as a result of several high profile pipeline incidents that have had significant consequences, including the loss of life. As a result there is increased emphasis on improving the management of pipeline integrity. This increased emphasis has taken the form of laws, regulations, and industry standards leading to improved pipeline company practices.

A key component of effective pipeline integrity management is the integration of information about the condition of a pipeline so that site-specific risk analysis can be carried out to prioritize inspection and repair. As part of the process, data from multiple sources using multiple coordinate systems need to be translated and correlated into a common frame of reference so that data features can be aligned for observation of coincident events.

Unfortunately, in many cases pipeline operators are overwhelmed by this data and cannot effectively access, integrate, or analyze data relationships, thus limiting the value of this data in decision-making processes. There is thus a need to provide the pipeline industry with an effective and affordable way to meet these regulatory and operating challenges, and in particular, a need to effectively manage the vast amounts of collected data relating to pipeline infrastructure, in a way that enables pipeline operators to maintain pipeline integrity.

If the underlying relevancy of the data is not managed and communicated, the value of the data integration and any subsequent analysis of the combined data set is questionable.

SUMMARY OF THE INVENTION

According to one aspect of the present invention, there is provided a method of managing pipeline datasets comprising the steps of: establishing an asset survey for a pipeline by correlating a first data set with a spatial representation of the pipeline, the data set including a plurality of point features along a length of the pipeline, each point feature having a source type, a source name, an indication type, and a status associated therewith, the source type having a relative priority; integrating a second data set with the asset survey; and setting the status field of each feature point in dependence upon its at least one of its relative age, source and type.

According to another aspect of the present invention, there is provided apparatus for managing pipeline datasets comprising: a centerline model for a pipeline; a module for establishing an asset survey for a pipeline by correlating a first data set with a spatial representation of the pipeline, the data set including a plurality of point features along a length of the pipeline, each point feature having a source type, a source name, an indication type, and a status associated therewith, the source type having a relative priority; a weld matching module for integrating a second data set with the asset survey; and a data management module for setting the status field of each feature point in dependence upon its at least one of its relative age, source and type.

All "on pipe" point features are defined by their source type (Source), the particular data set identified as the source name (Name), and the indication type (Type) in order to empower subsequent data management processes. An example of a Source/Source Name combination would be ILI (in-line inspection)/1998 MFL Run. This structure ensures the ability to trace a record to the originating data source.

In order to effectively manage the integrity of a pipeline it is imperative that the data be effectively managed such that overall relevancy of the individual data set is clearly communicated to the users of the data. Although individual elements such as date, spatial accuracy and measurement accuracy are all important parameters, they are not always available to, nor understood by, the users or stakeholders. Consequently, the need exists for an overarching framework to clearly communicate the relevancy of the data set as well as define associated rules as to how that data set will impact other data sets or processes.

The data field "status" was developed and a framework of processes and algorithms were defined to provide structure and flexibility to the management of the assignment of a record's "status". The field "status" has five distinct states; active, inactive, archived, super inactive and super active. Active is representative of the latest and most accurate condition of the pipeline to your knowledge. Inactive indicates that the record has either been superseded by better data or the record is from new data and has not yet been validated as accurate. Super inactive indicates the record has been superseded to the extent that it cannot subsequently be made active through normal data management processes. Archived indicates the record is associated with a piece of pipe that was removed from service (i.e. cut out of the pipeline). Where as super active indicates that the record is an absolute fact and that irrespective of whatever other data is subsequently gathered for that section of pipeline, the super active record will always been seen as active or representative of the current condition of the pipeline.

Key determinants in a records status are the chronology and source of the data set for a particular section of pipe. An application of this is that the ILI for the extent of pipe that is exposed during an excavation will be automatically turned super inactive. The ILI data has been superseded by the excavation data because the excavation data is based on the empirical inspection of the pipe surface as opposed to the inferential interpretation of the ILI data. This process can be applied one step further in the assignment of Super Active status to the NDE records. In this case if the defects found in the excavation were coated with a highly reliable coating (liquid urethane epoxy applied under controlled conditions) they would accurately represent the condition of the pipe irrespective subsequent ILI data.

Similarly, when a new ILI run is imported, its point indication data will assume the status of inactive until it can be validated as being an accurate representation of the pipe condition. Beyond that point each type of indication (e.g. weld, metal loss, geometry etc) can be individually assigned a status based on different rule sets for different linear extents of the ILI. The result is not only timely status management, but also an opportunity for the integrity engineer to share his interpretation expertise to the corporate enterprise though the highly granular application of status assignment.

BRIEF DESCRIPTION OF THE DRAWINGS

The present invention will be further understood from the following detailed description, with reference to the accompanying drawings, in which.

DETAILED DESCRIPTION OF EMBODIMENTS OF THE INVENTION

Figure 1:
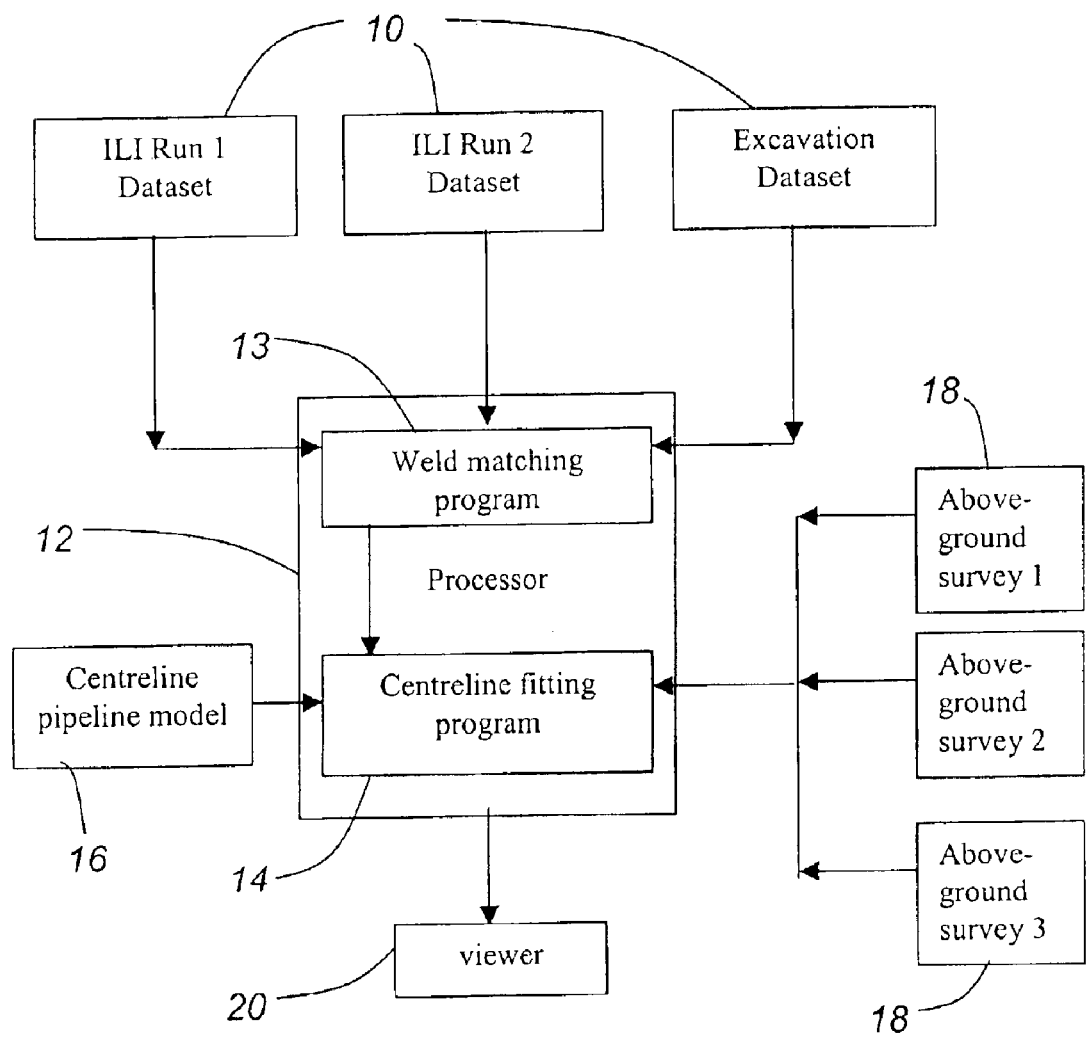
FIG. 1 illustrates in a functional block diagram data flow into and out of a pipeline data processor programmed to manage multiple pipeline datasets in accordance with an embodiment of the present invention.

One of the regulatory requirements for an integrity management program is for a pipeline operator to integrate pipeline information from diverse data sources so that a comprehensive analysis can be made of the threats to a pipeline's integrity. These data sources include:

Pipe property: This data is associated with the specifications and properties of the pipe, e.g. pipe thickness, coating data. The properties are generally consistent within each pipe joint. Consequently, these properties typically transition at the welds that join the joints together.

Above-ground surveys: This data includes all the above ground surveys associated with Direct Assessment (DA), such as Cathodic Protection (CP), Direct Current Voltage Gradient (DCVG), Pipeline Current Mapper (PCM), as well as other environmental parameters such as land use and topography.

In-Line Inspections (ILI): This data is collected from the measurements taken by inspection vehicles that travel along the interior of a pipeline. Such measurements are known as ILI surveys, and are typically performed while the pipeline is in operation; product flow is typically used to propel the inspection vehicle, although self-propelled models can also be used. The data collected by the ILI survey includes pipeline features such as valves, welds, and branch connections, and defects such as metal loss, dents, and cracks.

The data collected by the ILI survey is spatially organized by referencing the location of each measurement point in terms of a linear distance along the pipe to a selected start position in the pipe, e.g. the start of the ILI run. The linear distance can be determined by an odometer on the inspection vehicle, which tracks the distance travelled by the vehicle as it rolls along the inside the pipeline.

Excavation: For purposes of this document excavation data is termed non-destructive examination (NDE) data. This data is generated from measurements taken during the course of an excavation or dig that exposes the pipe surface. The measurements can be spatially referenced to a control point, typically a girth weld that was exposed in the excavation.

Operational: This data typically relates to the product or environment inside the pipe.

According to an embodiment of the invention, there is provided a spatial integration method for spatially integrating datasets from different data sources, to produce a single integrated dataset that can be used, for example, by a pipeline operator to maintain the integrity of his pipeline. Unlike conventional GIS systems that simply overlay datasets for viewing purposes, the spatial integration method of this embodiment uses elements or fit points within each different dataset to spatially align the datasets not only relative to each other, but also to a "real world" location. Furthermore, the spatial integration method is provided with steps that spatially integrate multiple ILI datasets, by matching their respective welds. This enables new ILI datasets to be readily integrated with existing ILI datasets for a particular pipeline section.

Referring to FIG. 1, a data processor 12 is programmed with a pipeline dataset management program that can integrate multiple pipeline datasets and display information selected from one or more integrated datasets. The dataset management program comprises a weld-matching module 13 for spatially integrating ILI runs, to produce an integrated below-ground dataset ("asset survey"), and a centreline fitting program 14 to spatially integrate the asset survey against a 3-D pipeline model 16 and above-ground survey datasets 18. Selected information from the spatially integrated above-ground and below-ground datasets are transmittable to a viewer 20 for viewing.

In-Line Inspection (ILI) Surveys

The ILI tool records the location of the features it detects by associating a linear measure along the pipeline to each of these features. The linear measure or odometer distance is determined by counting the revolutions of onboard odometer wheels that are rolling along the internal surface of the pipeline as the tool travels along the pipeline. Circumferential welds used to connect the joints of pipe represent a commonly identifiable feature occurring on a more or less regular interval along the pipeline. Multiple ILI runs are integrated with each other through a weld matching process that takes into consideration that there is not necessarily a one to one match given the potential for misidentification of welds as well as the possibility the weld tally could have been modified due to pipe replacements or cut-outs. This process of integrating the ILI runs through alignment of the welds minimizes the relative error between the multiple ILI runs or data sets by re-zeroing the odometer error at each set of matched welds.

Figure 2:
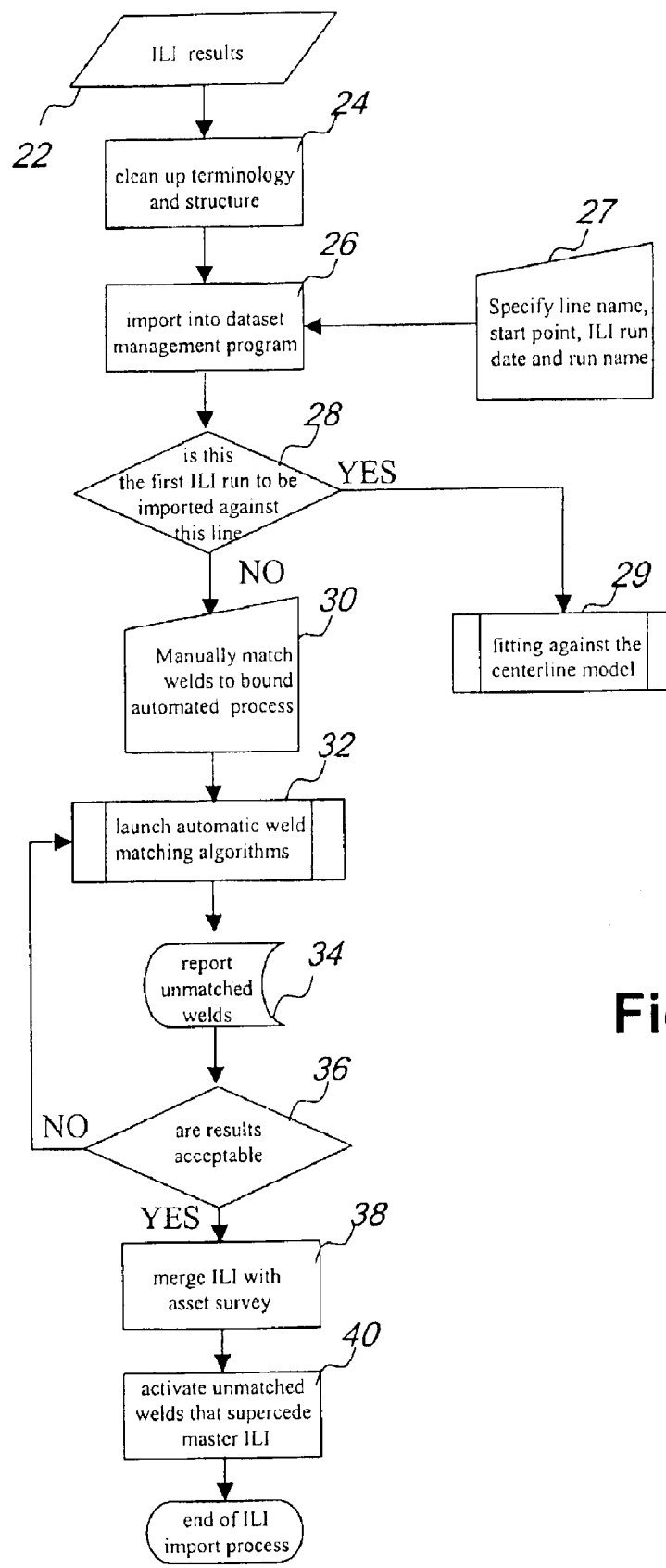
FIG. 2 illustrates in a flowchart of an inline inspection (ILI) dataset integration process performed by the pipeline data processor of FIG. 1.

Given the number of welds within an ILI run of 100 km (at least one weld occurs every 40 to 80 feet depending on the pipe manufacturing process), it is evident that the ILI weld tally is voluminous. Therefore, the spatial integration module 13 of the dataset management program is provided to automate the spatial integration aspect of the ILI dataset integration process whereas the centreline fitting program 14 accurately positions the ILI indications in space ("real world" coordinates). Referring to FIG. 2, the ILI dataset integration process begins first by obtaining a tabulation of all ILI indications (shown as process block 22 in FIG. 2). As the terminology and data organization may vary from ILI run to ILI run, such terminology and data organization are formatted so that they are consistent and can be understood by the dataset management program (shown as process block 24 in FIG. 2).

The formatted ILI dataset 10 is then imported into the dataset management program (shown as process block 26 in FIG. 2). At this stage, an operator will manually specify a name for the ILI dataset, its start point in the pipeline, and its run date, if such information is not already provided (shown as process block 42 in FIG. 2).

Referring to process block 28 in FIG. 2, if the ILI dataset 10 is the first ILI dataset to be imported into the dataset management program, it is spatially integrated with the 3D pipeline model by executing the centreline fitting module in the program (shown as process block 40 in FIG. 2). If ILI datasets are already present, then this ILI dataset 10 is spatially integrated with the other ILI datasets by executing the weld matching module in the program (discussed in detail below); this is shown as process blocks 30, 32 in FIG. 2.

The process of automatically spatially integrating multiple ILI datasets involves weld matching multiple ILI datasets to a single selected ILI dataset to produce a single integrated dataset. This single ILI dataset is known as the "master" and defines the joint lengths and weld positions of the integrated dataset. The data from the other ILI dataset is then spatially slaved to the master dataset by executing the weld matching module 13 of the dataset management program. The resulting integrated data set in known as an "asset survey". Into this same asset survey is integrated the excavation data set.

Once the weld-matching process has been completed, a report of the unmatched welds can be generated (process block 34 in FIG. 2) and a user can analyse this report.

Spatially Normalizing Asset Survey (Integrated ILI Results) and NDE Datasets

There are two processes through which the NDE data and Asset survey are spatially integrated. The first involves the manual matching of welds in the NDE to welds in the Asset survey. The weld positions relative to each other (pipe joint lengths) will be dictated by the NDE data similar to the impact the master ILI has on the slave ILI's. Correspondingly, the linear position of points in the Asset survey that are between the matched weld pairs are repositioned by interpolation between the new relatives welds position.

The second element a weld in the NDE data set driving the creation of a fit point on the centreline model as its position is now explicitly known. Correspondingly that weld which is now part of the Asset survey is matched to the newly created fit point. As a result the Asset survey is refit between the new fit points and the nearest upstream and downstream fit points; the Asset survey is stretched or shrunk such that the NDE welds matches with new and corresponding fit point in the centreline model. A corresponding record is created of the new fit point match and the magnitude of the modification required to the Asset survey in order to align the points.

Assigning Relevancy to ILI and Excavation Records

Figure 3A:
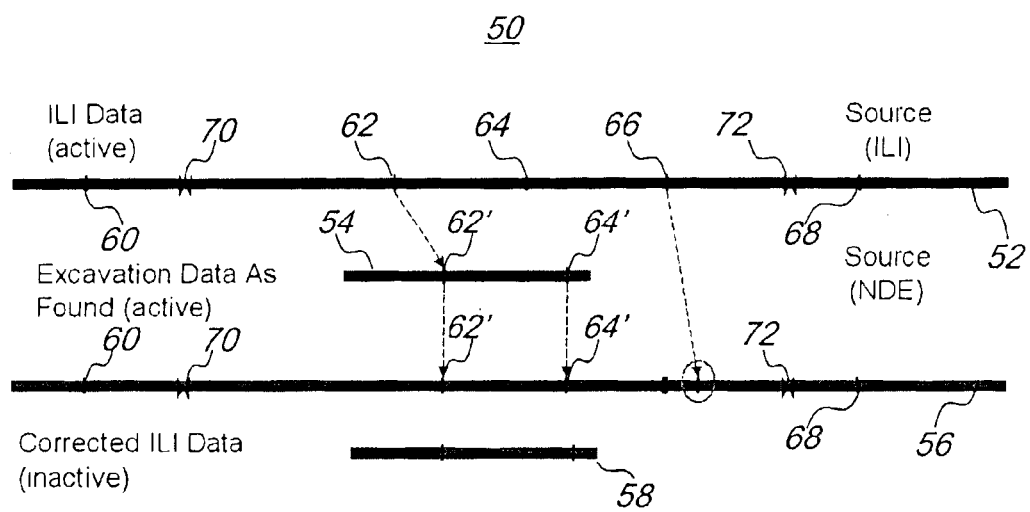
FIGS. 3a and 3b illustrate in functional block diagrams representing pipeline data and the management thereof in accordance with an embodiment of the present invention.
Figure 3B:
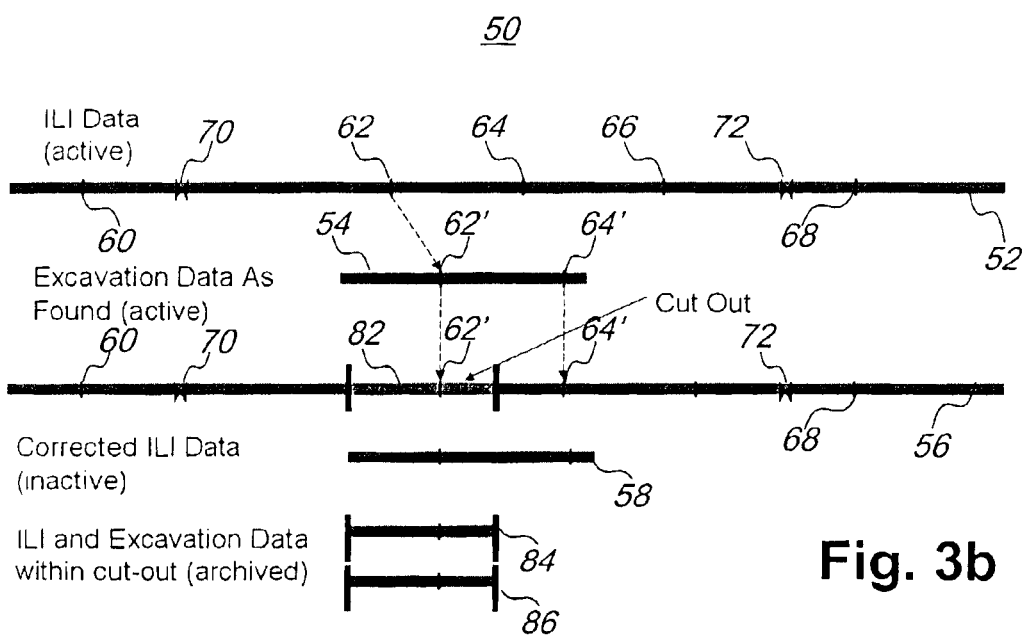

Referring to FIGS. 3*a* and 3*b* there are illustrated in functional block diagrams representing pipeline data and the management thereof in accordance with an embodiment of the present invention.

FIG. 3*a* shows a pipeline model 50 including data from an in-line inspection (ILI) 52 and excavation (otherwise referred to as "NDE") data 54. The pipeline model is updated with the excavation data to form a new pipeline model 56, while a corresponding section of the ILI data is corrected with regard to physical reference points and given a status of inactive 58. Pipeline data uses physical reference points to correlate one data set to another data set. So for example ILI data 52 includes weld positions 62, 64, 66, and 68 and valve locations 70 and 72. When a section of the pipeline is excavated, physical data is collected as represented by excavation data 54, which may reveal somewhat different locations for welds 62 and 64, as represented by weld locations 62' and 64'. In order to achieve a pipeline model that accurately reflects the physical state of the pipeline being monitored, the section of the pipeline model corresponding to the excavation data 54 is effectively replaced by the excavation data to form a composite pipeline model 56. And the excavation data supersedes the ILI data 58, which is given a super inactive status.

FIG. 3*b* provides an example of how further changes to the physical pipeline are reflected in the pipeline model 50. Using the same ILI and excavation data as FIG. 3*a*, as a result of the excavation a section 82 of the pipeline is deemed needing replacement. As a result of the replacement section the pipeline model 56 is updated with physical data for the new section, while both ILI and excavation data corresponding to the cut out section 82 are archived. Clearly from this simple example, managing data associated with a pipeline is non-trivial, while the consequences of inaccurately modeling the pipeline can be enormous.

Figure 4:
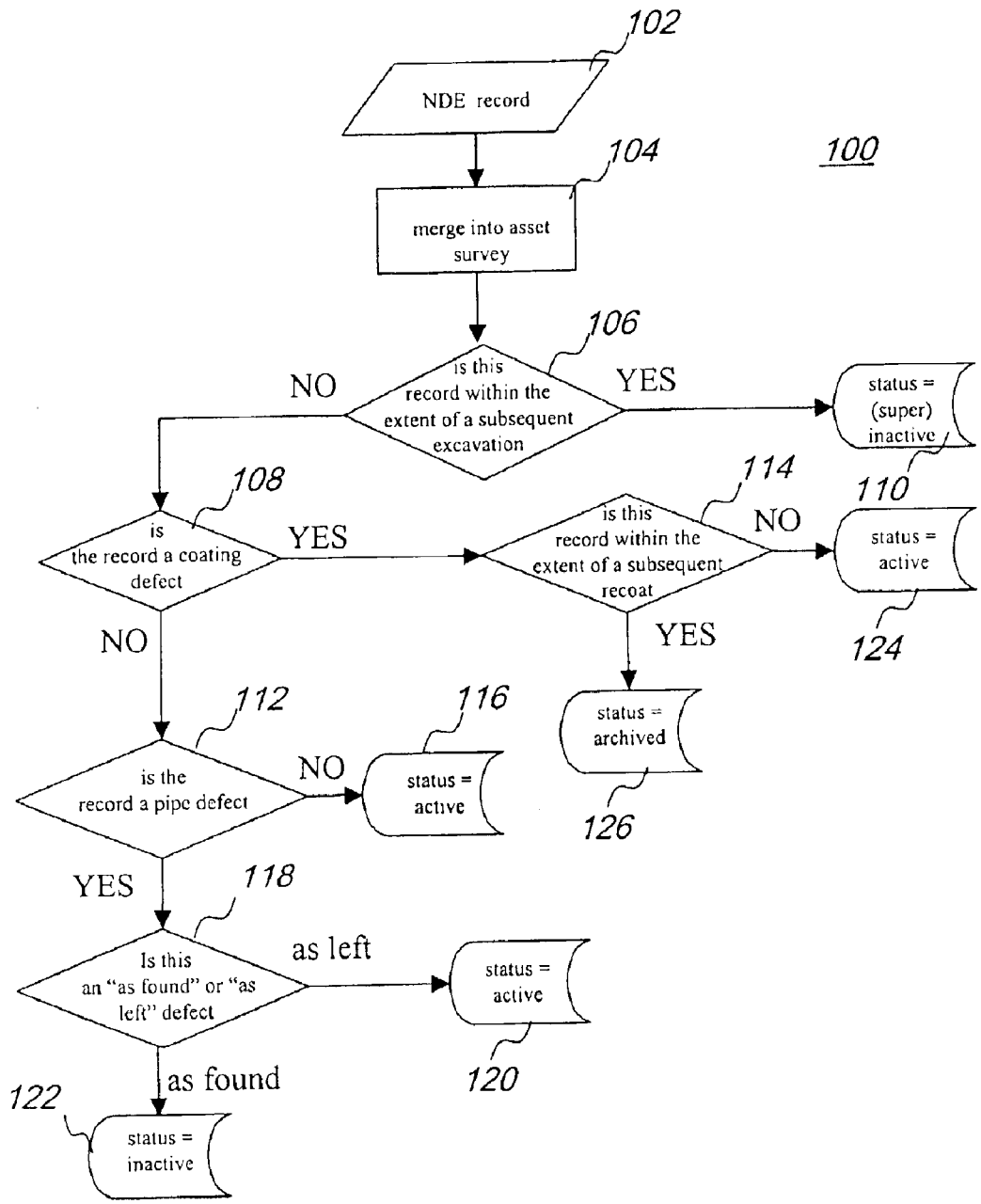
FIG. 4 illustrates in a flowchart a method of managing relevancy of data during the NDE dataset integration process of FIGS. 3a and 3b.

Referring to FIG. 4 illustrated in a flowchart a method of managing relevancy of data during the NDE dataset integration process of FIGS. 3*a* and 3*b*. The method 100 begins with a NDE record as presented by 102. This data is merged into the pipeline's asset survey as represented by a process block 104. A first decision block 106 queries whether this record is within the extent of a subsequent excavation. If NO, a second decision block 108 asks if the record is a coating defect. If YES to the first decision block 106, a status=(super) inactive is stored for this record, as represented by 110.

A NO to the second decision block 108 leads to a third decision block 112 that queries whether the record is a pipe defect. A YES to the second decision block leads to a fourth decision block 114, which queries if the record is within the extent of a subsequent recoat. A NO to the third decision block 112 leads to a store data block 116, status=active.

A YES to the third decision block 112 leads to a fifth decision block 118 querying whether the defect is an "as found" or "as left" defect. "As left" leads to a store data status=active 120. "As found" leads to a store data status= inactive 122. A NO to the fourth decision block 114 leads to a store data status=active 124. A YES leads to a store data status=archived 126.

Figure 5:
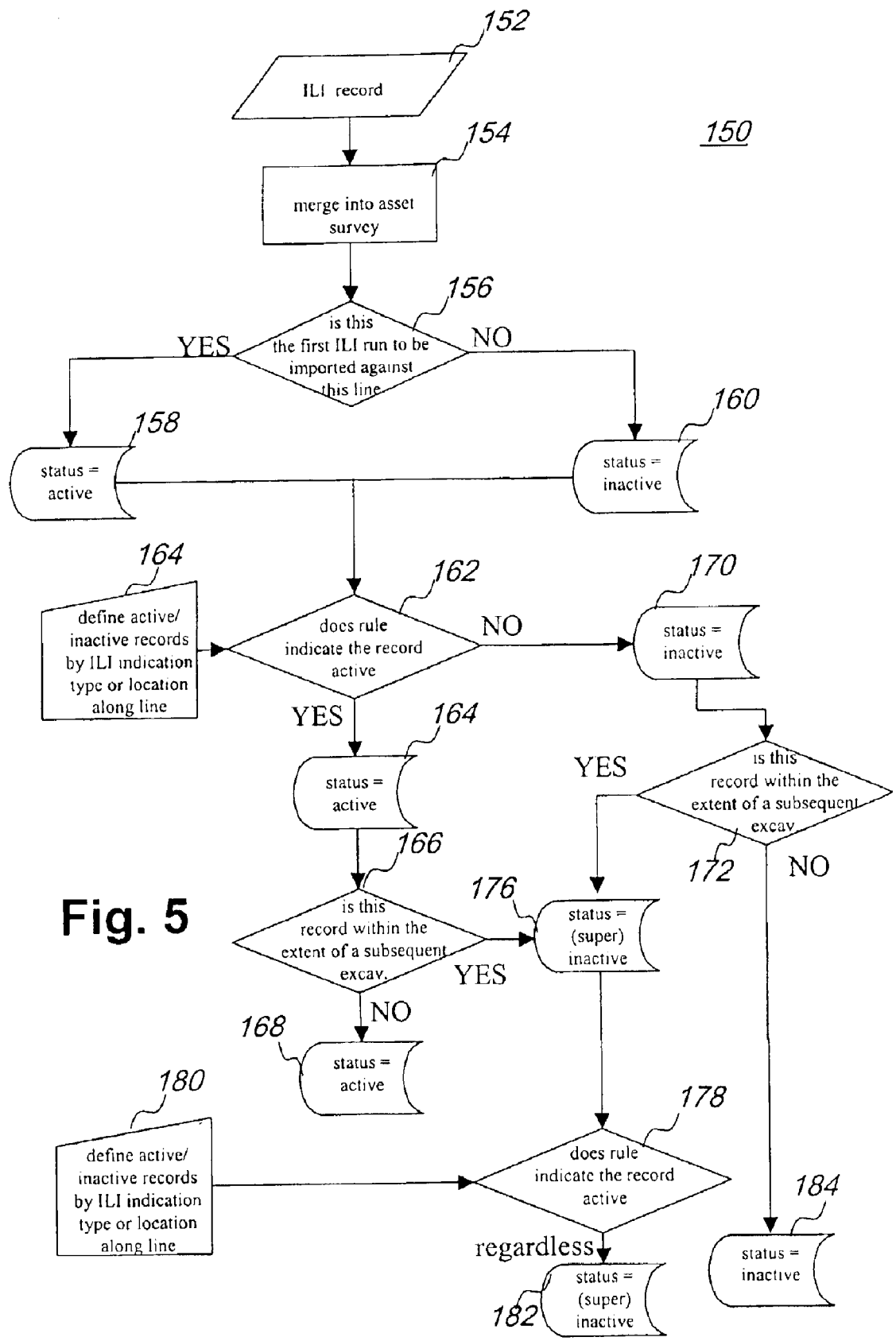
FIG. 5 illustrates in a flowchart of a method of managing relevancy of data during the process of the ILI dataset integration process of FIGS. 3a and 3b.

Referring to FIG. 5 illustrates in a flowchart a method of managing relevancy of data during the process of the ILI dataset integration process of FIGS. 3*a* and 3*b*. The method 150 begins with an ILI data record 152. The record is merged into the asset survey, as represented by a process block 154. The method then queries whether this is the first ILI run to be imported against this line, as represented by decision block 156. A YES leads to a store data block 158 status=active, while a NO leads to a store data block 160 status=inactive.

Then the method asks whether rule indicates the record is active, as represented by a second decision block 162, based on a rule set using record type and location along the line to define active/inactive records as represented by 164. A YES leads to a store data block 164 status=active, which leads to a third decision block 166 querying whether this record is within the extent of a subsequent excavation, to which a NO leads to a store data block 168 status=active. While a NO to the second decision block 162 leads to a store data block 170 status=inactive. This is followed by a fourth decision block 172 querying whether this record is within the extent of a subsequent excavation, to which a NO leads to a store data block 184 status=inactive. A YES to the third decision block 166 or the fourth decision block 172 leads to a store data block 176 status=(super) inactive. This is followed by a fifth decision block 178 querying whether rule indicates the record is active based upon input as represented by 180. Regardless the decision block 178 leads a store data block 182 status=(super) inactive.

What is claimed is:

1. A method of managing pipeline datasets to comprising the steps of:
 establishing an asset survey for a pipeline by correlating a first data set with a spatial representation of the pipeline, the data set including a plurality of point features along a length of the pipeline, each point feature having a source, a name, a type and a status associated therewith, the source having a relative priority;
 integrating a second data set with the asset survey; and
 setting the status field of each feature point in dependence upon its at least one of its relative age, source and type;
 wherein the status is one of active and inactive.

2. A method as claimed in claim 1 wherein the step of establishing includes the step of setting the status field of each feature point of the first data set to active.

3. A method as claimed in claim 2 wherein the step of setting the status field includes the step of comparing each feature point of the second data set to a corresponding feature point of the first data set.

4. A method as claimed in claim 3 wherein the step setting the status field includes giving an active status to a more recent point feature of the same type.

5. A method as claimed in claim 4 further comprising the step of rendering a representation of the pipeline dependant upon the status of each feature point.

6. A method as claimed in claim 1 wherein the status is one of active, inactive, super active, super inactive and archived.

7. A method as claimed in claim 6 wherein the step setting the status field includes giving a super inactive status to an older point feature of a lower priority type.

8. A method as claimed in claim 7 further comprising the step of rendering a representation of the pipeline dependant upon the status of each feature point.

9. A method as claimed in claim 6 wherein the step setting the status field includes giving a super active status to a point feature of a higher priority type.

10. A method as claimed in claim 9 further comprising the step of rendering a representation of the pipeline in dependence upon status of each feature point.

11. A method as claimed in claim 4 wherein the type includes at least one of in-line inspection (ILI) and non-destructive examination (NDE).

12. A method as claimed in claim 11 wherein NDE data has a higher priority than ILI data.

13. A method as claimed in claim 6 wherein the type includes at least one of in-line inspection (ILI) and non-destructive examination (NDE).

14. A method as claimed in claim 13 wherein NDE data has a higher priority than ILI data.

15. A method as claimed in claim 6 wherein the step setting the status field includes giving an archived status to a point feature associated with a section of pipe that has been cut-out of the pipeline and removed from service.

16. Apparatus for managing pipeline datasets to comprising:
 a centerline model for a pipeline;
 a module for establishing an asset survey for a pipeline by correlating a first data set with a spatial representation of the pipeline, the data set including a plurality of point features along a length of the pipeline, each point feature having a type, a name, and a status associated therewith, the type having a relative priority;
 a weld matching module for integrating a second data set with the asset survey; and
 a data management module for setting the status field of each feature point in dependence upon its at least one of its relative age and type.

17. Apparatus as claimed in claim 15 wherein the status is one of active, inactive, super active, super inactive and archived.

18. Apparatus as claimed in claim 16 wherein the module for setting the status field includes means for giving a super inactive status to a more recent point feature of a lower priority type.

19. Apparatus as claimed in claim 17 further comprising a viewer for rendering a representation of the pipeline in dependence upon status of each feature point.

20. Apparatus as claimed in claim 16 wherein the module for setting the status field includes means for giving a super active status to a point feature of a higher priority type.

21. Apparatus as claimed in claim 19 further comprising a viewer for rendering a representation of the pipeline in dependence upon status of each feature point.

22. Apparatus as claimed in claim 14 wherein the type includes at least one of in-line inspection (ILI) and non-destructive examination (NDE).

23. Apparatus as claimed in claim 21 wherein NDE data has a higher priority than ILI data.

24. Apparatus as claimed in claim 16 wherein the type includes at least one of in-line inspection (ILI) and non-destructive examination (NDE).

25. Apparatus as claimed in claim 23 wherein NDE data has a higher priority than ILI data.

26. A method as claimed in claim 16 wherein the step setting the status field includes giving an archived status to a point feature associated with a section of pipe that has been cut-out of the pipeline and removed from service.

* * * * *